United States Patent [19]
Higashi

[11] Patent Number: 5,934,412
[45] Date of Patent: Aug. 10, 1999

[54] GREASE NIPPLE

[76] Inventor: Takehiro Higashi, 4-13, Kiypmidaiminami 2 chome, Kisarazu, Chiba, Japan

[21] Appl. No.: 08/898,968

[22] Filed: Jul. 23, 1997

[30] Foreign Application Priority Data

Apr. 28, 1997 [JP] Japan .................................... 9-122867

[51] Int. Cl.$^6$ .............. F16D 3/38; F16N 21/02
[52] U.S. Cl. ..................... 184/105.3; 184/105.1
[58] Field of Search ............... 184/105.3, 105.1, 184/105.2

[56] References Cited

U.S. PATENT DOCUMENTS

| | | | |
|---|---|---|---|
| 3,756,349 | 9/1973 | Klüh | 184/105.3 |
| 5,598,902 | 2/1997 | Lin | 184/105.3 |

FOREIGN PATENT DOCUMENTS 3102620  10/1991  Japan .
3033404  10/1996  Japan .

*Primary Examiner*—John A. Jeffery
*Assistant Examiner*—David Fenstermacher
*Attorney, Agent, or Firm*—Bachman & LaPointe, P.C.

[57] ABSTRACT

A grease nipple includes a fixture, a plurality of nipples arranged in radial directions around the circumference of the fixture and fixed thereto, and a screw projecting at one side of the fixture and tapering in a direction away from the fixture. A grease feed passage is formed through the fixture and the screw for feeding grease to a universal joint spider. A clamp portion is further provided between the fixture and the screw. The clamp portion has a width, as measured between the fixture and the screw, to provide a spacing between the fixture and the universal joint spider for receiving a thickness of a grease feed pipe between one of the nipples and the universal joint spider when the grease nipple is attached to the universal joint spider via the screw. The clamp portion may be formed integral with the fixture and the screw.

5 Claims, 4 Drawing Sheets

GREASE NIPPLE

BACKGROUND OF THE INVENTION

1. Field of the Invention

The present invention relates to a grease nipple for feeding lubricant or grease to a joint portion between adjacent propeller shaft parts of a split-type propeller shaft employed in a large-size automobile.

2. Description of the Prior Art

An automobile propeller shaft is arranged between an engine and a wheel drive shaft so as to be rotatable at the high speed for transmitting the power of the engine to the wheel drive shaft.

In an ordinary passenger car, a small-size truck or the like, one continuous-type propeller shaft is used for transmitting the power from the engine. On the other hand, in a large-size automobile, such as a bus, a large-size truck or a dump car, the total weight thereof becomes considerably large including a large weight of a body itself and weights of carried goods or passengers. In addition to those weights, vibration is further applied to the propeller shaft during running so that the propeller shaft is subjected to forces of bending, deflection and the like. If the propeller shaft is bent or deflected, the smooth transmission of the power can not be achieved and breakage of the propeller shaft is further induced.

Under these circumstances, in the foregoing large-size automobile, the propeller shaft is divided or split into a plurality of propeller shaft parts, such as two to four parts, and the split parts are arranged in series, that is, in a length direction, between the engine and the wheel drive shaft such that axial ends of the adjacent propeller shaft parts are coupled to each other.

The adjacent propeller shaft parts can be coupled to each other as shown, for example, in FIG. 4. Specifically, U-shaped joint yokes B are formed at axial ends of split propeller shaft parts A, and the joint yokes B of the adjacent propeller shaft parts A are disposed in a crossing fashion and coupled to each other using a cross-shaped universal joint spider C as shown in FIG. 5. This arrangement is shown in FIGS. 3 and 4 of Japanese First (unexamined) Utility Model Publication No. 3-102620.

By coupling the plurality of propeller shaft parts A via the joint yokes B in the length direction, even if the forces of bending, deflection, vibration and the like are applied to the coupled propeller shaft, the joint portions each constituted by the joint yokes B and the spider C can absorb them so that the whole propeller shaft can be rotated smoothly to transmit the power.

As appreciated, each joint portion between the adjacent propeller shaft parts A actually includes four coupling portions between the joint yokes B and the spider C, where the joint yokes B and the spider C are coupled to each other via bearings (not shown). For reducing frictional resistance, it is necessary to feed grease to each of the bearings periodically.

As shown in FIGS. 4 and 5, an L-shaped grease nipple D has been used for feeding grease to the bearings via the spider C.

As shown in detail in FIG. 6, the grease nipple D includes a hollow round fixture E, a hollow fixing screw F projecting from one side of the fixture E, and a nipple G coupled to the fixture E on the circumference thereof. A grease feed passage H is formed through the inside of the fixture E and the fixing screw F for allowing the flow of grease therethrough.

When the fixture E is coupled to the spider C via the fixing screw F, a grease feed port of the nipple G is oriented laterally along the surface of the spider C. In this state, a grease feed pipe I called a grease gun is normally used for delivering grease into a grease distribution passage J formed in the spider C via the nipple G and the grease feed passage H of the fixture E and the fixing screw F so that the grease is fed to the coupling bearings between the joint yokes B and the spider C.

The grease feed pipe I has a thickened tip portion, and a ring K which is split circumferentially into a plurality of parts is fitted into the tip of the grease feed pipe I. The ring K is biased radially toward the center of the grease feed pipe I by springs L disposed in the tip of the grease feed pipe I. The grease feed pipe I is inserted from between the joint yokes B and the spider C and fitted over the nipple G at the tip thereof.

In this state, since the ring K is fitted over the nipple G at a concave circumference thereof and tightened by the biasing force of the springs L, the nipple G and the grease feed pipe I are stably coupled to each other. If the grease is fed under pressure from a grease feeder (not shown) through the grease feed pipe I in this state, a ball N which is urged by a spring M to normally close the grease feed port of the nipple G is forced into the nipple G due to the pressure of grease so that the grease enters the nipple G via the opened grease feed port and then is transferred into the spider C via the grease feed passage H.

The grease feed position to the nipple G is limited when using the grease feed pipe I. On the other hand, since the grease nipple D has only one nipple G, it may happen that the grease feed pipe I can not be coupled to the nipple G depending on orientation of the ball N, that is, the grease feed port, of the nipple G so that the supply of grease is disabled. If that happens, a person who feeds grease asks another person to drive the vehicle and slowly move it forward or backward to rotate the propeller shaft and then signalizes the driver to stop the engine when the grease feed port of the nipple G is oriented so as to be connectable with the grease feed pipe I.

However, it happened that the grease feeding person was injured by getting hit by the moving vehicle while confirming the rotation of the propeller shaft or the orientation of the nipple G.

Further, in case of the dump car, the supply of grease may be performed from above a chassis while a loading bed is raised slantly. However, it happened that the driver operated a lever for the loading bed in error in response to a request from the grease feeding person to move the vehicle so that the grease feeding person was seriously injured or died by being pressed under the loading bed.

In view of the foregoing problems caused by the L-shaped grease nipple D, an improved grease nipple D as shown in FIGS. 7 and 8 has been proposed. The improved grease nipple D differs from the foregoing L-shaped grease nipple D in that a plurality of nipples G are arranged in radial directions around the circumference of a round fixture E and coupled thereto. Accordingly, without specifying the orientation of each of the nipples G, the supply of grease can be easily achieved using desired one of the nipples G.

On the other hand, even in the foregoing improved grease nipple D, a fixing screw F projecting from one side of the fixture E has the same diameter from the base to the tip thereof. Therefore, it often happened that after attachment to the spider C, the fixing screw F was loosened due to vibration of the vehicle, rotational vibration of the propeller shaft or the like so as to cause the grease nipple D to come off the spider C. Further, since the coming-off of the grease nipple D occurred during running of the vehicle, constant provision of a spare grease nipple D was required.

Particularly, since the grease nipple D has no clamp portion (nut or the like) to be clamped by a tool, such as a spanner, the grease nipple D should be clamped by hand so that a clamping force is small to cause the grease nipple D to easily come off.

In view of this, a further improved grease nipple D as shown in FIG. 9 has been proposed.

The further improved grease nipple D differs from the foregoing improved grease nipple D shown in FIGS. 7 and 8 in that a fixing screw F tapers from the base to the tip thereof, that is, the outer diameters of the fixing screw F are reduced in a direction away from the fixture E, and that a polygonal clamp portion O is provided on a side of the fixture E opposite to or remote from the fixing screw F. This grease nipple D is disclosed in Japanese Utility Model Application No. 8-7387 (Japanese Utility Model Registration No. 3033404).

Since the fixing screw F tapers toward the tip, that is, in the direction away from the fixture E, when screwed into a threaded hole of the spider C, the fixing screw F is firmly or tightly forced thereinto and not loosened. Further, since the polygonal clamp portion O is provided at the side of the fixture E remote from the fixing screw F, the fixing screw F can be tightly clamped using the tool, such as the spanner, to prevent the grease nipple D from coming off the spider C during running of the vehicle. However, this grease nipple D has problems that an interval or spacing between the fixing screw F and the fixture E is small and that the clamp portion O is provided at the position remote from the fixing screw F.

Specifically, as shown in FIG. 6, when feeding grease to the spider C using the grease nipple D, the tip of the grease feed pipe I is fitted over the nipple G. Since the tip portion of the grease feed pipe I is thickened as shown in the figure, a spacing is necessary between the nipple G and the spider C for receiving therein at least a thickness of the tip of the grease feed pipe I. However, in the grease nipple D shown in FIG. 9, since the spacing between the fixture E and the fixing screw F is small, the spacing between the nipple G and the spider C becomes small when the grease nipple D is attached to the spider C. Therefore, the tip of the grease feed pipe I can not be received between the nipple G and the spider C so that fitting of the grease feed pipe I over the nipple G is disabled.

Further, since the clamp portion O is arranged at the position remote from the fixing screw F via the fixture E interposed therebetween and further since there is provided only the limited small space between the joint yokes B and the spider C, when, for example, the grease nipple D is rotated using the spanner while the centers of the fixing screw F and the threaded hole of the spider C do not match with each other, it may happen that the fixing screw F is coupled in a slant posture relative to the spider C and that forcible screwing of the fixing screw F crushes the threads to disable detachment of the grease nipple D from the spider C. When the fixing screw F and the clamp portion O are remote from each other, it is difficult to match the centers of the fixing screw F and the threaded hole of the spider C upon rotating the fixture E in a clamping direction and further, if the fixing screw F is forcibly screwed into the threaded hole of the spider C, the supply of grease may be impeded.

SUMMARY OF THE INVENTION

Therefore, it is an object of the present invention to provide a grease nipple that can eliminate one or more of the problems caused by the foregoing conventional grease nipples.

According to one aspect of the present invention, a grease nipple comprises a fixture; a plurality of nipples arranged in radial directions around the circumference of the fixture, the nipples fixed to the fixture; a screw projecting at one side of the fixture and tapering in a direction away from the fixture; a grease feed passage formed through the fixture and the screw for feeding grease to a given object; and a clamp portion provided between the fixture and the screw so as to ensure a given large spacing between the fixture and the given object when the grease nipple is attached to the given object via the screw.

It may be arranged that the clamp portion has a width, as measured between the fixture and the screw, to provide the given large spacing between the fixture and the given object for receiving a thickness of a grease feed pipe between one of the nipples and the given object.

It may be arranged that the clamp portion is formed integral with the fixture and the screw.

It may be arranged that the clamp portion is in the form of a nut.

It may be arranged that the clamp portion has a polygonal shape.

It may be arranged that the given object is a universal joint spider.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Figure 1:
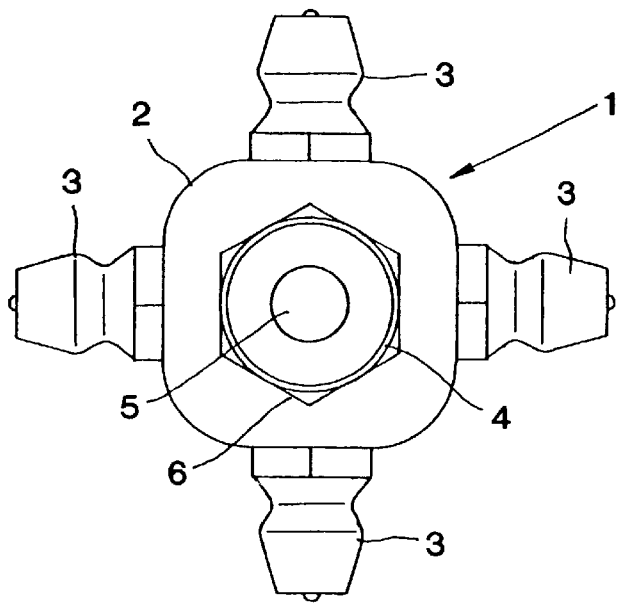
FIG. 1 is a front view of a grease nipple according to a preferred embodiment of the present invention.
Figure 2:
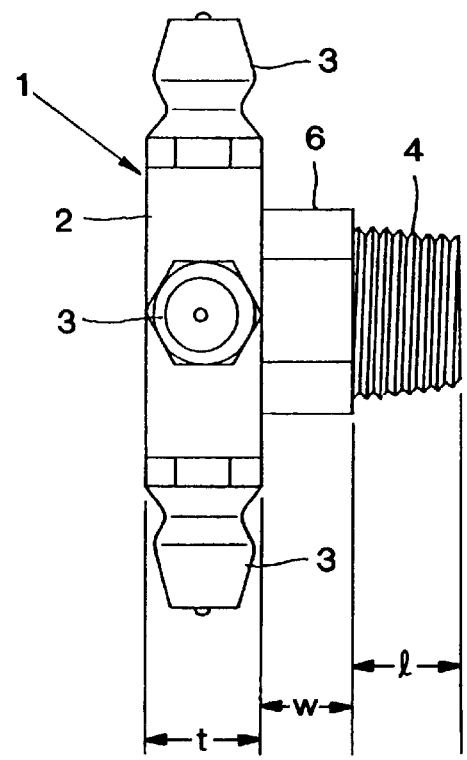
FIG. 2 is a side view of the grease nipple shown in FIG. 1.
Figure 3:
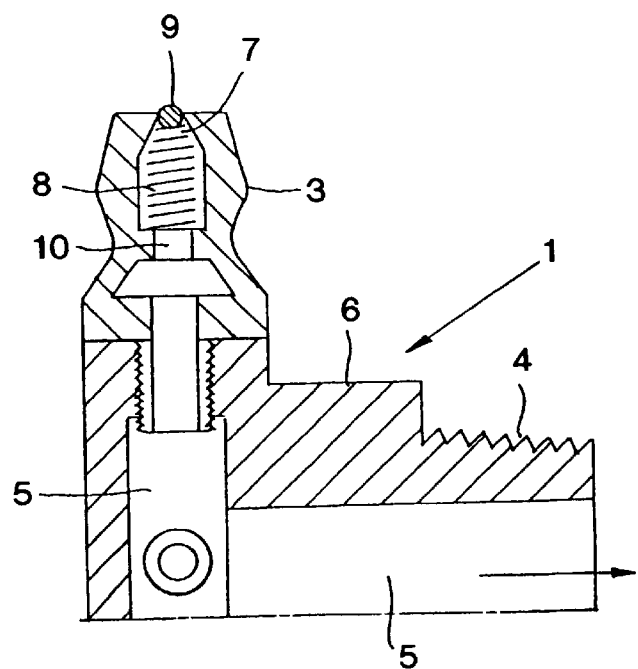
FIG. 3 is an enlarged sectional view of a main portion of the grease nipple shown in FIG. 1.
Figure 4:
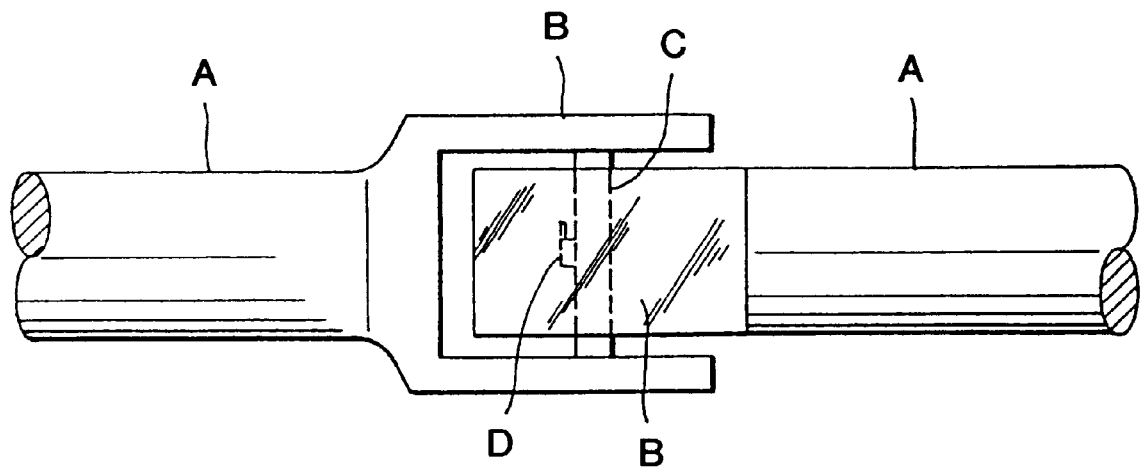
FIG. 4 is a side view showing the state where joint yokes of adjacent split propeller shaft parts are coupled to each other using a universal joint spider with a conventional grease nipple attached to the spider.
Figure 5:
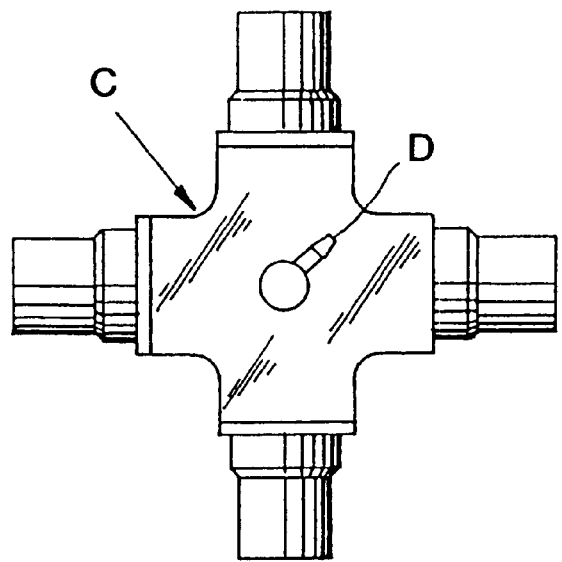
FIG. 5 is a front view of the spider with the conventional grease nipple attached thereto.
Figure 6:
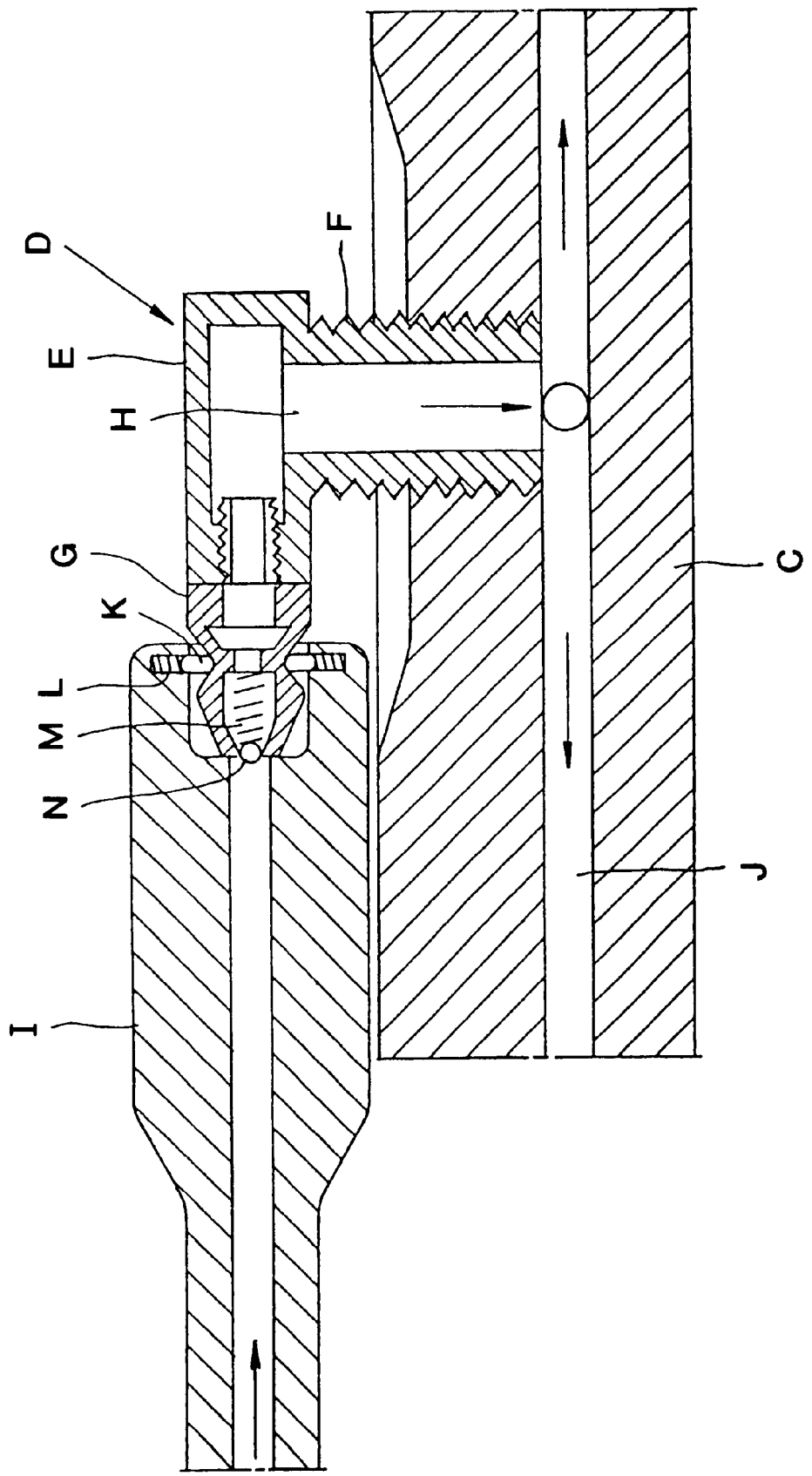
FIG. 6 is a sectional view showing the state where a grease feed pipe is coupled to the conventional grease nipple attached to the spider.
Figure 7:
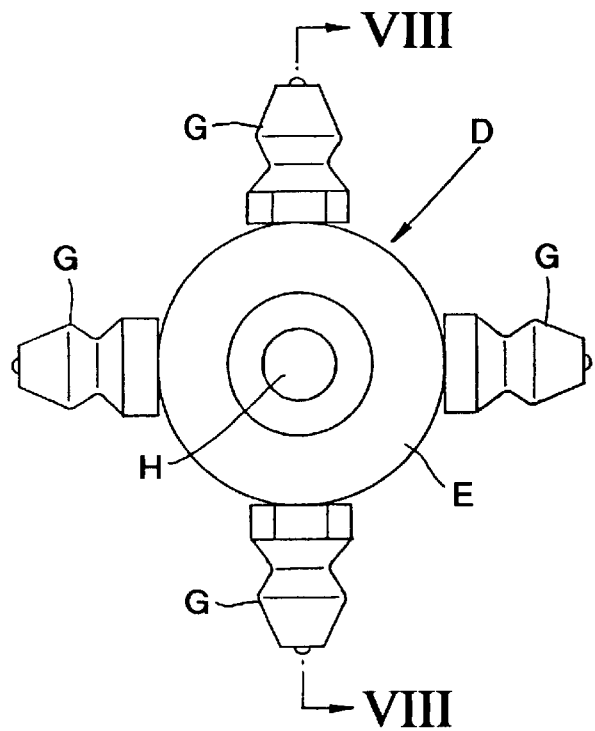
FIG. 7 is a front view of an improved conventional grease nipple.
Figure 8:
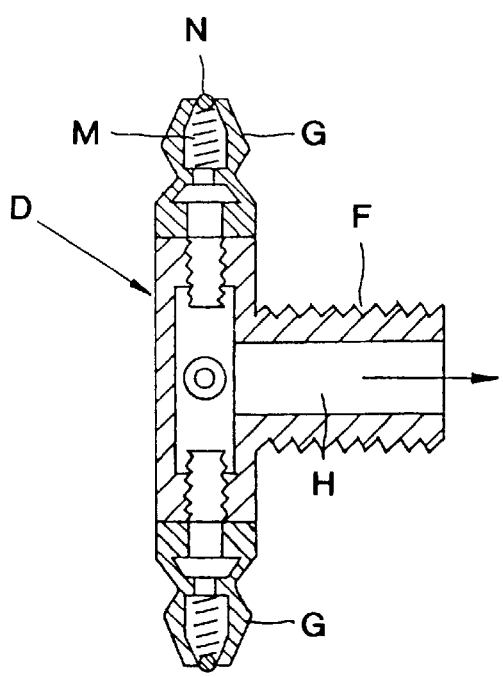
FIG. 8 is a sectional view taken along line VIII—VIII in FIG. 7.

Now, a preferred embodiment of the present invention will be described hereinbelow with reference to FIGS. 1–3.

In the figures, numeral 1 denotes a grease nipple according to the preferred embodiment of the present invention. Like the foregoing conventional grease nipple D shown in FIG. 9, the grease nipple 1 has a structure, wherein a plurality of nipples 3 are arranged in radial directions around the circumference of a round fixture 2 and coupled thereto, a fixing screw 4 projects at one side of the fixture 2 and tapers from the base to the tip thereof, that is, in a direction away from the fixture 2, and a grease feed passage 5 is formed through the inside of the fixture 2 and the fixing screw 4 for allowing the flow of grease therethrough.

Figure 9:
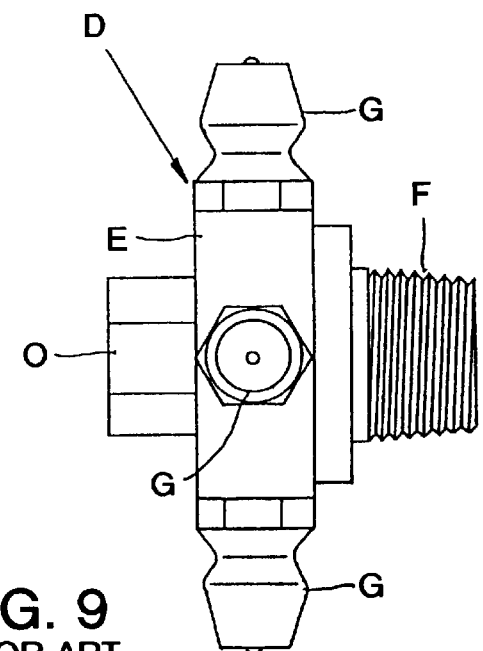
FIG. 9 is a side view of a further improved conventional grease nipple.

The grease nipple 1 differs from the conventional grease nipple D of FIG. 9 in that a polygonal, such as hexagonal, clamp portion 6 is provided between the fixture 2 having a thickness t and the fixing screw 4 having a length l and formed integral with the fixture 2 and the fixing screw 4. The clamp portion 6 has a width w, as measured between the fixture 2 and the fixing screw 4, large enough to provide a spacing between each of the nipples 3 and the fixing screw 4 which can receive therein at least a thickness of the tip of the grease feed pipe I (grease gun) when the fixing screw 4 is screwed into the threaded hole of the spider C. The width w is substantially equal to the thickness t and the length l.

The nipple 3 itself is known and can be fixed to the fixture 2 through screwing. A grease feed port 7 of the nipple 3 is normally closed at the tip thereof by a ball 9 due to a biasing force of a spring 8. When the grease feed port 7 is opened due to the pressure of grease introduced through the grease feed pipe I, the grease enters the nipple 3 and then is transferred into the spider C via a guide passage 10 of the nipple 3 and the grease feed passage 5.

The other structure of the grease nipple 1 is essentially the same as that of the conventional grease nipple D shown in FIG. 9.

Like the grease nipple D of FIG. 9, the grease nipple 1 is fixed to the spider C via the fixing screw 4, and desired one of the nipples 3 whose orientation allows the supply of grease is selected and connected to the known grease feed pipe 1. The ball 9 is forced into the nipple 3 due to the pressure of grease so that the grease feed port 7 is opened to introduce the grease under pressure into the nipple 3. Then, the grease flows through the guide passage 10 and the grease feed passage 5 so as to be fed to the bearings coupling the joint yokes B and the spider C.

According to the foregoing preferred embodiment of the present invention, since the plurality of nipples 3 are radially provided, desired one of the nipples 3 can be selected to feed the grease to the joint portion between the adjacent split propeller shaft parts.

Particularly, the clamp portion 6 is provided between the fixture 2 and the fixing screw 4 so as to set large the spacing between the fixture 2 and the fixing screw 4. Thus, when the fixing screw 4 is screwed into the threaded hole of the spider C, the large spacing is ensured between the fixture 2 and the spider C so that the tip of the grease feed pipe I can be inserted into this spacing to allow the easy coupling between the nipple 3 and the grease feed pipe I.

Further, since the fixing screw 4 and the clamp portion 6 are arranged adjacent to each other at one side of the fixture 2, the centers of the fixing screw 4 and the threaded hole of the spider C can be easily matched to allow secure clamping therebetween using the tool, such as the spanner, so that positioning of the grease nipple 1 relative to the spider C can be precisely achieved to ensure the reliable supply of grease to the spider C.

Further, since the clamp portion 6 has the sufficiently large width, even if the spanner is slanted to some extent relative to the center line of the fixing screw 4 in the narrow space between the joint yokes B and the spider C, it is still possible to fit the tip of the spanner around the clamp portion 6 and rotate the fixing screw 4 for clamping.

While the present invention has been described in terms of the preferred embodiment, the invention is not to be limited thereto, but can be embodied in various ways without departing from the principle of the invention as defined in the appended claims.

What is claimed is:

1. In combination, an object and a grease nipple comprising:
   a fixture;
   a plurality of nipples arranged in radial directions around the circumference of said fixture, said nipples fixed to said fixture;
   a screw projecting at one side of said fixture and tapering in a direction away from said fixture;
   a grease feed passage formed through said fixture and said screw for feeding grease to said object; and
   a polygonal clamp portion provided between said fixture and said screw so as to ensure a given large spacing between said fixture and said given object when said grease nipple is attached to said given object via said screw for insertion of a tool for adjusting the position of the grease nipple with respect to said given object wherein said clamp portion is formed integral with said fixture and said screw.

2. The grease nipple according to claim 1, wherein said polygonal clamp portion has a width, as measured between said fixture and said screw, to provide said given large spacing between said fixture and said given object for receiving a thickness of a grease feed pipe between one of said nipples and said given object.

3. The grease nipple according to claim 1, wherein said given object is a universal joint spider and said grease nipple is connected to said universal joint spider by means of said screw such that said polygonal clamp portion defines a spacing between said fixture and said universal joint spider.

4. The grease nipple according to claim 1, wherein said clamp portion is in the form of a nut.

5. A grease nipple comprising:
   a fixture having a thickness t;
   a plurality of nipples arranged in radial directions around the circumference of said fixture, said nipples fixed to said fixture;
   a screw having a length l projecting at one side of said fixture and tapering in a direction away from said fixture;
   a polygonal clamp portion having a width w provided between said screw and said fixture wherein the width w of the polygonal clamp portion is substantially equal to the thickness t of the fixture and the length l of the screw object wherein said clamp portion is formed integral with said fixture and said screw.

* * * * *